Patented Apr. 4, 1944

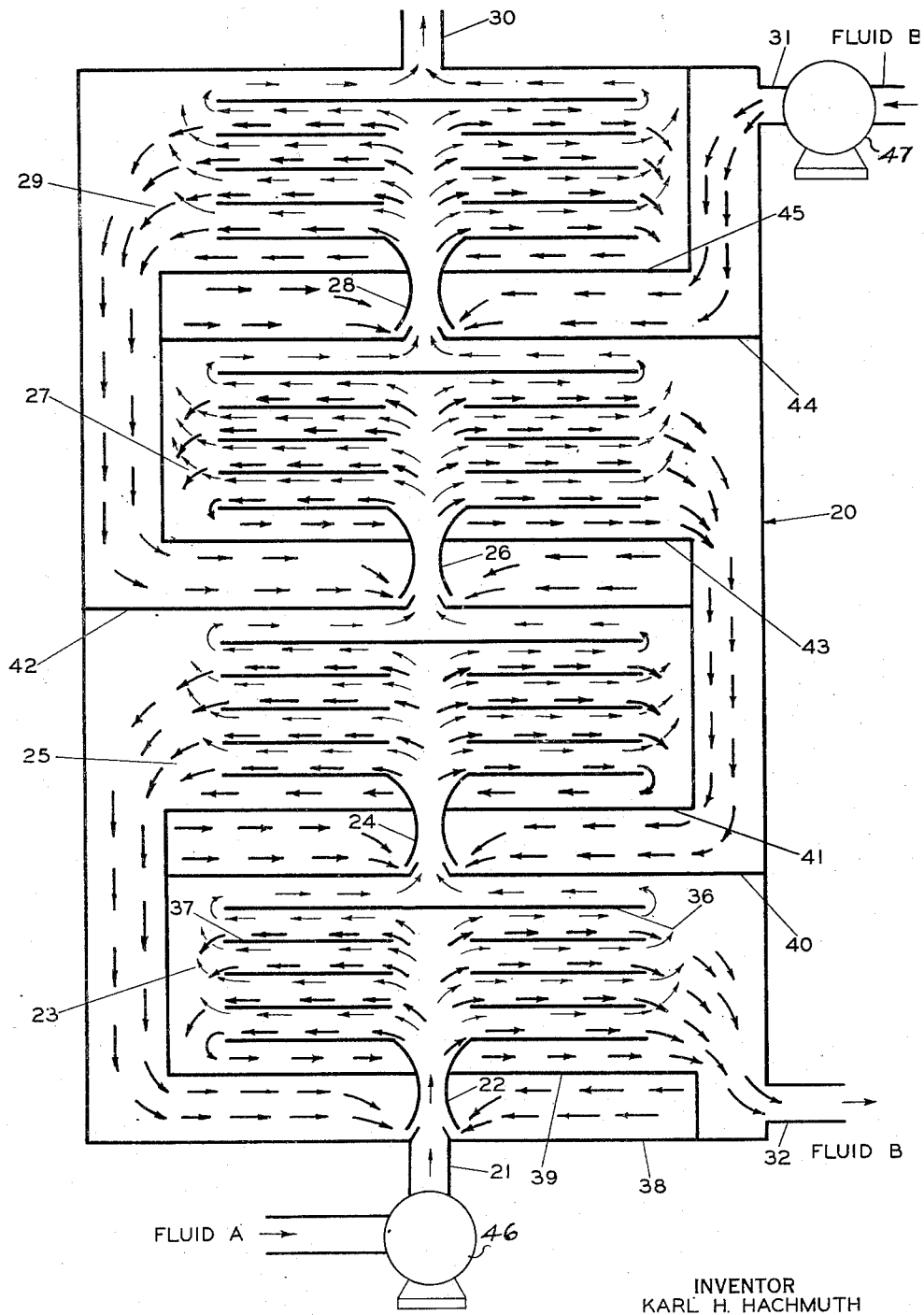

2,345,667

UNITED STATES PATENT OFFICE 2,345,667

CONTACTING APPARATUS

Karl H. Hachmuth, Bartlesville, Okla., assignor to Phillips Petroleum Company, a corporation of Delaware Application May 18, 1942, Serial No. 443,539

2 Claims. (Cl. 261—21)

This invention relates to apparatus for intimately, and preferably countercurrently, contacting materials comprising two phases, capable of being pumped, and has for its principal object the provision of an improved apparatus of this character. More particularly, the invention comprises a novel combination of eductors and settling tanks so arranged that intimate contact between the two phases can be established by repeatedly causing one of the phases to entrain the other phase in a number of eductors and settling tanks arranged and operated in series without intermediate pumps, operation depending upon a pressure differential between the two phases at the point of introduction into the eductors in each step of the series operation to pump one of the two phases being contacted with the other.

Numerous other aims, objects, and advantages will be readily apparent to those skilled in the art in the light of this specification taken in conjunction with the accompanying drawing which is a diagrammatic vertical central section of one form of the invention.

In its broadest aspect my invention comprises arranging in series a plurality of closed settling zones which are adapted to withstand the pressure resulting from discharge thereinto of the effluent of associated venturis or eductors thereinto. The two immiscible fluids which are to be intimately contacted with one another are supplied to the system, one being supplied at a higher pressure and being used as the operating fluid for the venturis and the other being supplied at a lower pressure to the suction inlet of the several venturis to be pumped thereby into intimate admixture into the settling zone with which each venturi is associated. After settling, the liquid which was used to operate the venturi associated with each zone is withdrawn from the zone while being maintained at substantially the pressure resulting from the discharge of the venturi into the zone and is passed at that pressure as the operating fluid through the next venturi associated with the succeeding zone.

In a preferred embodiment my invention arranges for countercurrent flow of the fluids being contacted, the fluid at the higher pressure being used as the driving fluid in the several venturis in series in the manner just described and being thereby successively reduced in pressure from the first to the last zone. The other fluid is introduced, at a lower pressure than that of the fresh driving fluid, to the suction side of the venturi associated with the last zone, the pressure of this fluid being at least slightly lower than the pressure of the driving or pumping fluid introduced to the main inlet of this last venturi. After separation in the last zone, the fluid being pumped, now at a higher pressure due to having had imparted to it a portion of the energy of the pumping fluid, is withdrawn and supplied as the liquid to be pumped to the suction inlet of the preceding venturi. This is kept up through the series of contactors and settling zones. The pumping fluid is withdrawn from the last zone and the fluid being pumped is withdrawn from the first zone.

By operating countercurrently in the preferred manner just described, the pressure relationships between the two fluids as they are introduced into the various stages or zones will be most advantageous for efficient and effective operation, because the pressure of the pumping fluid progressively decreases by stages as it flows from the first stage to the last, while simultaneously the pressure of the initially low pressure fluid being pumped progressively increases as it flows from the last zone to the first. Thus the pressure differential between the two fluids at the point of introduction into any one stage of the system is substantially less than the pressure differential between the two fluids when they are freshly introduced into the system. Consequently, the pressure differential of the two fluids at the eductors can be maintained at a comparatively low value even though a higher pressure differential is required between the fresh fluids at the points at which they are introduced into the system in order to drive them through the system. Therefore, the turbulence of fluid flow at the eductors can be maintained at a comparatively low value and the efficiency of operation of the eductors at a comparatively high value. The efficiency of the eductors is dependent largely upon the pressure differential between the two fluids being contacted, being relatively high at low differentials and relatively low at high differentials.

The invention is applicable to the contacting of two immiscible or not completely miscible liquids as in solvent extraction processes such as solvent extraction of a lubricating oil or of a rosin or resin solution with a solvent which is selective for either the objectionable or the desired components thereof. The invention may be applied in the so-called "copper sweetening" of gasoline wherein sour gasoline is contacted with an aqueous copper solution to sweeten it. The invention is also applicable to contacting a gas with a liquid. For example it finds particular application in the contacting of a gas containing a valuable component with a selective absorption liquid therefor, such as in extracting a gaseous hydrocarbon stream containing butadiene with furfural. While it may be applied to the reaction of a gas or a component of a gas with a liquid, generally the results are not all that could be desired because the pressure of the reacting mixture drops excessively so that the withdrawn liquid may not have sufficient pressure to operate the next venturi. Moreover the pressure of the countercurrently flowing gas drops so much due to its disappearance in the liquid by reaction therewith that satisfactory efficiency or effectiveness is not attained.

One of the fluids being contacted is always a liquid since as far as I am aware no cases of immiscible or incompletely miscible gases exist. The other fluid may be either a gas or a liquid. Either liquid may be clear or may be in the form of a slurry or emulsion of another material suspended or emulsified in a liquid. Thus my invention is applicable to other combinations than liquid-liquid such as liquid-gas, liquid-liquid slurry, liquid slurry-gas, etc.

It will be seen that my invention involves a system consisting of a combination of a series of venturis or eductors and settling tanks, zones, or chambers for intimately contacting two immiscible or only partially miscible fluid phases wherein one fluid phase is introduced to the system at a higher pressure than the other and serves to force the lower pressure fluid through the system, without the use of any intermediate pumps whatsoever, by imparting a portion of its pressure energy to the lower pressure fluid. The greater portion of the energy loss which occurs as the two fluids pass through the system takes place in the eductors through turbulence which serves to contact the two fluids intimately. Thus, this energy loss is used to an advantage.

The elimination of the necessity for using intermediate pumps in transferring either of the fluids through the system is a tremendous advantage since it makes for simplicity of construction, lower investment and more trouble-free operation.

The apparatus of the drawing may be used either in the position shown or in an inverted position with respect to that shown depending upon which fluid is in excess by volume.

With the chamber in the position shown, the lighter fluid A is introduced at the bottom of the chamber under pressure through the bottom Venturi eductor while the heavier fluid B is introduced at the top of the chamber at a pressure slightly lower than the pressure of the lighter fluid passing through the top Venturi eductor in the chamber. In other words the lighter fluid serves to pump the heavier fluid. In general, with this arrangement it is preferable that the lighter fluid be in excess of the heavier fluid.

With the chamber in the inverted position, the heavier fluid is introduced under pressure into the top of the chamber through the Venturi eductor that has assumed the top position by reason of inversion of the chamber. (This is the same Venturi eductor through which the lighter fluid is introduced when the chamber is in the position shown.) The lighter fluid is then introduced into the bottom of the chamber at a pressure slightly lower than that of the heavier fluid passing through the Venturi eductor that has assumed the bottom position by reason of the inversion of the chamber. In other words, with the chamber in this position the heavier fluid serves to pump the lighter fluid. In general, with this arrangement it is preferred that the heavier fluid be in excess of the lighter fluid.

The operation of the arrangement shown will now be described. The designations A and B will be used for the light and heavy fluids, respectively. The chamber 20 is divided into four settling chambers or zones 23, 25, 27 and 29 by means of pairs of spaced partitions 40—41, 42—43, 44—45. Venturis 22, 24, 26 and 28 extend through the lower wall 38—39 and these partitions, respectively, the suction portion of the venturi being disposed so as to be fed from between members 38 and 39, 40 and 41, 42 and 43, and 44 and 45. A plurality of horizontal baffles 37 are mounted in each of the chambers, these baffles having holes of suitable size in line with the discharge from the eductors 22, 24, 26, and 28; the bottom baffle in each chamber being tightly engaged by the Venturi tube of the eductor at the extremity extending into the chambers 23, 25, 27, and 29 or at a suitable distance above partitions 39, 41, 43, and 45. An imperforate top baffle 36 is mounted in the top of each chamber. The baffles 36 and 37 may be omitted without departing from the spirit of the invention. Fluid A enters through venturi 22 via line 21 and pump 46 and leaves via line 30. Fluid B is pumped in under lower pressure than that at which fluid A enters venturi 28, by means of pump 47 and line 31 and leaves via line 32.

Fluid A enters the system at the bottom of chamber 20 through pipe 21 and Venturi tube eductor 22 into settling zone 23. In conjunction with gravity, fluid B is pumped by eductor 22 from settling zone 25 above settling zone 23 into settling zone 23. The two liquids tend to separate in this zone, the heavier fluid B settling to the bottom and the lighter fluid A rising to the top. Settling zone 23 and subsequent zones, 25, 27, and 29 are equipped with the baffles shown and described above to reduce eddy currents and promote the separation of the two liquids. Fluid A passes up to the top of settling zone 23 through Venturi eductor 24 into settling zone 25. Fluid A in passing through Venturi eductor 24 also pumps fluid B, with the help of gravity, from settling zone 27 above settling zone 25 into settling zone 25. Again the two liquids separate into two phases and the process is repeated for as many settling zones and venturis as there are incorporated into a shell. In the drawing, fluid A is withdrawn from the top of chamber 20 through pipe 30 and fluid B is withdrawn from the chamber 20 through pipe 32. Fluid B is pumped into chamber 20 through pipe 31 by Venturi eductor 28. The contacting is accomplished through the turbulence set up in the Venturi eductors in pumping one fluid with another.

For any given system there will be a set of pressure, temperature, and other conditions for the two fluids which will give maximum efficiency. At that efficiency the ratio of the pumping fluid to the fluid being pumped will be some definite value. At the expense of lowered efficiency, it is possible to alter this ratio to any other ratio wherein the volume of one fluid required to pump a given volume of another is greater than that at maximum efficiency. In other words, the efficiency of the system determines the requirements in regard to the volume ratio at which the pumping fluid and the fluid being pumped must be supplied. For example, if the maximum efficiency of a system were 50 per cent, two volumes of pumping fluid would be required per volume of fluid being pumped—a ratio of 2 to 1; but if the volume of pumping fluid and the fluid with which it is to be contacted were available in the ratio of 3 to 1, the efficiency of the system would have to be decreased to 33⅓ per cent by some suitable means or another.

Altering the efficiency of a system to values below its maximum efficiency can be accomplished by several different means or combinations of them. For example, valves installed in the feed lines to a system of eductors and their accompanying settling zones, or chambers and in the fluid carrying zone between individual units in the system may be used to control the volume of flow of one fluid with respect to another and thus decrease the efficiency of the system; or the efficiency may be varied below the maximum by providing suitable means for adjusting the pressure differential, at the points of introduction into the system, between the two fluids to be contacted, etc.

In the described embodiment of the invention the fluid introduced into the system at the higher pressure gradually decreases in pressure. This pressure energy is lost by the fluid introduced at the higher pressure through general friction losses as it passes through the system and through imparting some of its energy to the lower pressure fluid. This latter item is explained as follows: In pumping the lower pressure fluid through an eductor the two fluids emerge from the eductor at some pressure intermediate to that of the original pressures of the two fluids, which means that at least a part of the pressure loss in the higher pressure fluid has been gained by the lower pressure fluid. Thus it can be seen that not only does the fluid introduced at the higher pressure gradually decrease in pressure as it passes through the system, but the fluid introduced at the lower pressure gradually increases in pressure as it passes through the system.

In industrial practice eductors generally run at less than 8 per cent efficiency. However, most industrial applications of eductors involve the pumping of large volumes of a fluid at low pressure by a relatively small volume of another fluid at a considerably higher pressure; consequently, high efficiencies are seldom reached because of the high degree of turbulence that tends to be set up between the high pressure and low pressure fluid as it passs through the eductor. In this invention, where the pressure differential between the pumping fluid and the fluid being pumped is comparatively small and the volume of fluid to be pumped is considerably less or about equal to the volume of the pumping fluid, the eductor efficiency is high compared with that obtained in the usual industrial applications of the eductor. Under favorable operating conditions an eductor efficiency of 50 per cent or better can be attained, the remaining energy being lost primarily through turbulent mixing of the two fluids in the venturi of the eductor. Since it is an object of the invention to intimately contact two fluids, this energy loss through turbulence in the eductor is not objectionable but advantageous.

While four settling zones are shown it will be obvious that any suitable number, ranging from two upwardly to ten or higher, may be used.

The terms "Venturi tube eductor," "Venturi eductor," "eductor," "ejector," and "venturi" have been used synonymously throughout the specification and they refer to the various modifications of the combination of a venturi and a nozzle for pumping a low pressure fluid with a high pressure fluid.

I claim:

1. Apparatus for effecting countercurrent contacting of two incompletely miscible fluids in a series of successive independent zones which comprises a hollow shell disposed vertically, a plurality of pairs of spaced horizontally disposed partitions in said shell arranged at intervals and forming therebetween a plurality of enclosed contacting and separating zones one above the other in said shell, a vertically disposed venturi associated with each of said pairs of partitions with the suction inlet communicating with the space between said partitions and arranged so that operating fluid separated in each intermediate zone is discharged as the operating fluid through the next venturi into the next zone and as it is so discharged withdraws the other fluid from said space between said partitions into intimate admixture with said operating fluid, the resulting mixture discharging into and separating in the succeeding zone, a partition adjacent one end of said shell, a first venturi vertically arranged and discharging through said end of said shell and said last-named partition into the zone adjacent said end and having its suction inlet communicating with the space between said end and said last-named partition, means for supplying fresh operating fluid from outside said shell to said first venturi, conduit means located wholly within said shell for conveying the other fluid separated in a succeeding zone to the suction inlet of a venturi discharging into a preceding zone, conduit means for drawing off from the shell and from the first zone the other fluid separated therein, conduit means for drawing off from the shell and from the final zone the operating fluid separated therein, and means for supplying fresh said other fluid from outside said shell to space between the final pair of partitions.

2. The apparatus of claim 1 further including a plurality of annular horizontal baffles in each of said zones disposed co-axially with said venturis and an imperforate horizontal baffle in each of said zones disposed between the last annular baffle and the next venturi, said baffles serving to reduce eddy currents and promote separation in said zones.

KARL H. HACHMUTH.